(12) United States Patent
Fraser (10) Patent No.: US 6,895,502 B1
(45) Date of Patent: May 17, 2005

(54) METHOD AND SYSTEM FOR SECURELY DISPLAYING AND CONFIRMING REQUEST TO PERFORM OPERATION ON HOST COMPUTER

(75) Inventor: Neil R. Fraser, Maineville, OH (US)

(73) Assignee: Curriculum Corporation, Kings Mill, OH (US)

( * ) Notice: Subject to any disclaimer, the term of this patent is extended or adjusted under 35 U.S.C. 154(b) by 983 days.

(21) Appl. No.: 09/590,329

(22) Filed: Jun. 8, 2000

(51) Int. Cl.$^7$ .............................................. H04L 9/00
(52) U.S. Cl. ...................... 713/168; 713/171; 713/182; 713/185
(58) Field of Search ................................ 713/168, 171, 713/182, 185, 192–194, 172, 200–201, 159; 380/227–229, 233; 711/163–164; 709/217, 219–229; 707/9–10

(56) References Cited

U.S. PATENT DOCUMENTS

| | | | |
|---|---|---|---|
| 4,200,770 A | 4/1980 | Hellman et al. ............... 178/22 |
| 4,656,474 A | 4/1987 | Mollier et al. ................ 380/28 |
| 4,758,714 A | 7/1988 | Carlson et al. .............. 230/380 |
| 4,918,653 A | 4/1990 | Johri et al. ................... 364/900 |
| 5,012,074 A | 4/1991 | Masada ........................ 235/379 |
| 5,048,085 A | 9/1991 | Abraham et al. ............. 380/23 |
| 5,065,429 A | 11/1991 | Lang ............................ 380/25 |
| 5,111,030 A | 5/1992 | Brasington et al. .......... 235/375 |
| 5,146,499 A | 9/1992 | Geffrotin ...................... 380/23 |
| 5,148,481 A | 9/1992 | Abraham et al. ............. 380/46 |
| 5,233,547 A | 8/1993 | Kapp et al. ................ 364/705.2 |
| 5,311,450 A | 5/1994 | Ojima ........................ 364/550 |
| 5,406,624 A | 4/1995 | Tulpan ........................... 380/4 |
| 5,515,440 A | 5/1996 | Mooney et al. ................ 380/25 |
| 5,546,463 A | * 8/1996 | Caputo et al. ............... 713/159 |
| 5,590,199 A | 12/1996 | Krajewski et al. ............. 380/25 |
| 5,596,718 A | 1/1997 | Boebert et al. ........ 395/187.01 |
| 5,713,018 A | 1/1998 | Chan .......................... 395/610 |
| 5,742,756 A | 4/1998 | Dillaway et al. ........... 395/186 |
| 5,745,555 A | 4/1998 | Mark ........................... 379/95 |
| 5,748,888 A | 5/1998 | Angelo et al. .............. 395/186 |
| 5,757,924 A | 5/1998 | Friedman et al. ............. 380/49 |
| 5,812,668 A | * 9/1998 | Weber ......................... 705/79 |

(Continued)

FOREIGN PATENT DOCUMENTS

| | | |
|---|---|---|
| WO | WO 98/47116 | 10/1998 |
| WO | WO 99/44114 | 9/1999 |
| WO | WO 99/61989 | 12/1999 |
| WO | WO 01/92982 | 12/2001 |

OTHER PUBLICATIONS

Rivest et al, "A Method for Obtaining Digital Signatures and Public Key Cryptosystems", *Communications of the ACM*, (Feb. 1978), pp. 1–15.

(Continued)

*Primary Examiner*—Kim Vu
*Assistant Examiner*—Hosuk Song
(74) *Attorney, Agent, or Firm*—Eric W. Guttag; Jagtiani + Guttag (57) ABSTRACT

A method and system for a client user remotely connected to a server computer by a client workstation such as a client personal computer to have securely displayed and to securely confirm that a request to access a resource on the server computer was actually requested by the client user, even if the security of the client computer has been compromised. This method and system can use conventional intelligent security tokens such as smart cards and associated smart card readers as a more secure environment to prompt for, and determine, the client user's intent to access the requested resource. A display securely accessible from the reader, smart card or both displays the resource (or resources) apparently being requested by client user. The client user is prompted to indicate whether it was their intention to access a resource by an input device associated with the reader or smart card.

20 Claims, 4 Drawing Sheets

U.S. PATENT DOCUMENTS

| | | | |
|---|---|---|---|
| 5,815,577 A | 9/1998 | Clark | 380/52 |
| 5,828,753 A | 10/1998 | Davis | 380/49 |
| 5,835,601 A | 11/1998 | Shimbo et al. | 380/49 |
| 5,838,812 A | 11/1998 | Pare et al. | 382/115 |
| 5,841,869 A | 11/1998 | Merkling et al. | 385/25 |
| 5,867,795 A | 2/1999 | Novis et al. | 455/566 |
| 5,907,350 A | 5/1999 | Nemirofsky | 348/13 |
| 5,920,730 A | 7/1999 | Vincent | 395/834 |
| 5,935,243 A | 8/1999 | Hasebe et al. | 713/200 |
| 5,940,591 A | 8/1999 | Boyle et al. | 395/187.01 |
| 5,963,924 A | 10/1999 | Williams et al. | 705/40 |
| 5,974,143 A | 10/1999 | Davis | 380/10 |
| 5,978,918 A | 11/1999 | Scholnick et al. | 713/201 |
| 6,006,328 A | 12/1999 | Drake | 713/200 |
| 6,092,202 A | 7/2000 | Veil et al. | 713/202 |
| 6,430,407 B1 | 8/2002 | Turtianien | 455/411 |
| 6,442,690 B1 * | 8/2002 | Howard et al. | 713/175 |
| 6,539,478 B1 * | 3/2003 | Furuya et al. | 713/150 |

OTHER PUBLICATIONS

White Paper, "File Systems in a Distributed Computing Environment" at http://www.transarc.com/Library.whitepapers/OSF_Whitepapers/dfs.html.

Newman et al, "Public Key Management for Network Security", *IEEE Network Magazine*, (Apr. 1987), vol. 1, No. 2, pp. 11–16.

Steiner et al, "Kerberos: An Authentication Service for Open Network Systems"(paper presented at Winter USENIX 1988, Jan. 12, 1988), pp. 1–15.

Adams et al, "Internet RFC 2510," *Internet X.509 Public Key Infrastructure Certificate Management Protocols.*, (Mar. 1999), pp. 1–10.

* cited by examiner

METHOD AND SYSTEM FOR SECURELY DISPLAYING AND CONFIRMING REQUEST TO PERFORM OPERATION ON HOST COMPUTER

STATEMENT REGARDING FEDERALLY SPONSORED RESEARCH

This invention was made with Government support under SBIR Contract No. DAAH01-98-C-R200 awarded by the U.S. Army Aviation and Missile Command. The Government has certain rights to the invention.

TECHNICAL FIELD

The present application relates to a method and system for a client computer user remotely connected to a host computer or server to have securely displayed and to securely confirm that a request to perform an operation on the host computer was actually requested by the client user, even if the security of the client computer has been potentially compromised. The present invention particularly relates to a method and system for a client user to be securely prompted when such a request is made and to securely confirm this request using an intelligent security token such as a "smart card" and associated devices.

BACKGROUND OF THE INVENTION

In order to access resources in a networked "environment, a user first needs to provide proof of their identity. An authentication protocol is usually employed to allow the user to prove their identity to the host computer or server. The authentication protocol allows the user to prove identity by demonstrating knowledge of a private password, or Personal Identification Number (PIN), as well as, perhaps, the possession of another, "stronger" key. The (remote) authentication server can also hold a copy of this password or PIN. The purpose of the authentication protocol is to hide the user's password, PIN or key from any eavesdropper, hacker or intruder (hereinafter collectively referred to as "intruder") listening to or accessing communications between the networked client and server computer systems. See Rivest et al, "A Method for Obtaining Digital Signatures and Public Key Cryptosystems", *Communications of the ACM*, (February 1978); U.S. Pat. No. 4,200,770 (Hellman et al), issued Apr. 29, 1980. In some cases, the "stronger" key is kept on the disk or memory of the client computer or workstation. In many computer security products, the typical assumption is that the component "at risk" to being compromised by an intruder breaking in is the network connection only, and not the client or server systems themselves.

In an environment where there is the possibility of an intruder compromising the client computer itself, an intelligent security token (typically referred to as a "smart card") can help protect the user's password, PIN or keys from theft or improper use. In this system, the user enters their password or PIN directly on the keypad of the associated smart card reader. Entry of the correct password or PIN allows the smart card to use a stronger cryptographic key to protect its communication between the card and the remote server authentication system. In other words, the authentication procedure is divided into two stages: (a) initial authentication of the user by the smart card protected by the user's "weaker" password or PIN; and (b) subsequent authentication of the user by the remote authentication server protected by the "stronger" key stored on the smart card. The first of these stages is vulnerable to unauthorized access if the password or PIN is entered by the keyboard attached to the computer that is associated with the smart card. For example, an intruder can intercept the keystrokes (via the client computer operating system) and learn the password or PIN. See U.S. Pat. No. 5,920,730 (Vincent), issued Jul. 6, 1999, which describes a system where a smart card reader sits between the client computer and its respective keyboard so that the smart card can block any information to and from the host computer when the password or PIN is entered by the user, thus protecting the password or PIN from being compromised.

In a more common system, an input device is locally attached to the smart card reader. When prompted to do so, the user enters their password or PIN directly to the card reader via this device. The password or PIN provided by the user cannot be obtained by an intruder on the client computer because: (a) it is difficult to modify the behavior of the smart card; and (b) the smart card is designed to never divulge the users password or PIN, or the cryptographic key on the card.

Smart cards have been used to display some or all of the information in electronic transactions. For example, U.S. Pat. No. 5,963,924 (Williams et al), issued Oct. 5, 1999, describes an electronic purse application where the user sees a graphical representation of several payment methods presented on the display to enable the user to select a payment method of their choice. In this point of sale application, the smart card reader can display the amount of digital cash present in a consumer's electronic purse smart card. See also U.S. Pat. No. 5,907,350 (Nemirofsky), issued May 25, 1999, which describes how, in a digital satellite system, smart cards have been used to display electronic coupons on an LCD display on a smart card itself so that the coupons can be read (and then deleted) by a point of sale checkout.

A display mounted on the smart card itself (i.e., without a card reader) can be also be used for two-stage authentication. In this scheme, the user reads a set of characters from the display and types these same characters into their computer keyboard as an authenticator. The remote authentication server verifies whether the authenticator matches one of a plurality of values that could have been generated by the smart card and authenticates if a match is identified. U.S. Pat. No. 5,974,143 (Davis), issued Oct. 26, 1999, describes one such method and system where the smart card is able to make use of some part of the main display capability of the computer monitor, but without the operating system of that computer having any access to the part of the display controlled by the smart card. This allows the user to read some of the information that pertains to the electronic transaction without the possibility of an intruder modifying the information displayed (via the client user's computer). However, this system does not allow the client user to securely reject this transaction. For example, if the client computer has been compromised, the client user could compare the two screens and try to reject the transaction, but the intruder (or a computer virus such as a "Trojan Horse" file) could change the user's "reject" reply to an "accept" reply" because there is no secure feedback mechanism available to the server.

U.S. Pat. No. 5,596,718 (Boebert et al), issued Jan. 21, 1997, relates to a trusted system where an encryption device (such as a smart card) is used to create a secure (general-purpose) networked computer and to provide a secure video overlay capability so that the server computer could display information securely on the potentially insecure client computer. However, the client user is required to deliberately invoke this trusted path mode for these security features to be in place. In other words, the trusted path security system is not automatic. See also U.S. Pat. No. 5,406,624 (Tulpan), issued Apr. 11, 1995, which describes a similar system.

U.S. Pat. No. 5,742,756 (Dillaway et al), issued Apr. 21, 1998, relates to a secure method to allow the user to prove that they are currently present at the smart card reader. When it is time to authorize the electronic transaction in this system, the smart card cuts off the communications with the client computer and waits for the user to depress a "yes" key to show proof of presence. An intruder having access to the client computer can not provide this proof of presence and therefore cannot complete the transaction. However, this system cannot securely display to the user what form of transaction is to be authorized. In addition, an intruder having access to the user's host computer or server, and the video card of the server computer, could present the client user with a visual prompt to ask the client user to authorize a transaction and then change that authorized-transaction to a different one from the one authorized by the user. For example, the intruder could visually prompt the user to authorize a small payment, with the intruder using that authorization to request a much larger payment, or an entirely separate resource such as access to sensitive data of the user. See also U.S. Pat. No. 5,838,812 (Pare et al), issued Nov. 17, 1998, which describes an authorization scheme that attempts to avoid using an intelligent security token such as a smart card by instead using a biometric measurement from the user (such as a fingerprint); this type of system is, however, still unable to deal with the local client computer being compromised since the intruder can learn (and later replay) the biometric signature.

Several types of client-server systems have been developed that provide ways for authenticating the client user's identity and/or authorizing access to the server by the user. Once such system is referred to as distributed file access. In order to obtain a file from a remote host computer such as a server in a distributed file access system, the user must first authenticate (prove) their identity. Subsequent attempts to access files residing on this remote server involve the local client operating system passing the identity of the requestor to the authorization subsystem on the server. This subsystem either grants or denies access to the file based upon certain authorization criteria, often using an Access Control List.

An inherent weakness in the distributed file access system is that a simple identity is passed to the server. For example, an unauthorized intruder can modify this identity to match the client user who has valid access to some specified file or files on the server. As a result, some improved distributed file access systems provide for credential verification of the client user with the file request, for example, proof of identity such as by using a Kerberos V privilege attribute certificate. A Kerberos V certificate proves that the requester had previously proved their identity to a third-party authentication service. See Open Group's white paper entitled "File Systems in a Distributed Computing Environment" that can be found at http://www.transarc.com/Library/whitepapers/OSF_Whitepapers/dfs.html.

A weakness in this approach is that it assumes that an intruder has not compromised the client user's computer operating system. Once compromised, the intruder can either: (a) steal a copy of the client user's authentication credentials; or (b) lay down a computer virus (e.g., a "Trojan Horse" file) in a path that will later be executed by the client user. In either case, an authenticated request could later be transmitted to the authorization service of the server that would include the authenticated identity of the client user, even though that user had no intention to perform the particular file request. This would allow the unauthorized intruder to gain access to the file once it is transferred to the client computer, thus allowing the intruder direct access to and ability to exploit the remote server computer.

Another system used to authenticate client user file requests to a remote file server is by Remote Procedure Call (RPC) technologies, such as DCOM/ActiveX as implemented in Microsoft Windows 2000. RPC systems pass the authentication credentials along with the RPC request, using the previously described Kerberos protocol. See Steiner, "Kerberos: An Authentication Service for Open Network Systems" (paper presented at Winter USENIX 1988, Jan. 12, 1988), pp. 1–15. In RPC systems, the server and client call authenticate to each other remotely, preferably using a smart card to improve upon the security of the Kerberos protocol. See U.S. Pat. No. 5,590,199 (Krajewski et al), issued Dec. 31, 1996. Like the distributed file access system previously described, the client computer can be compromised, allowing a "Trojan Horse" type of attack on the RPC server. In this case, the intruder can, for example, modify the dynamic linked libraries used by the RPC software such that the software makes authenticated requests for services that the client user did not intend. Current defenses against these types of "Trojan Horse" attacks on RPC systems are limited.

Another authentication and authorization method that has been used with web-based environments is a digital certificate, often based on the X.509 protocol. See Adams et al, "Internet RFC 2510," *Internet X.509 Public Key Infrastructure Certificate Management Protocols*. The certificate includes the client user's unique identifier, public key and other information such as an e-mail address. A certificate authority signs the client user's certificate at the time of authentication. The certificate then acts as semi-permanent proof of identity of the client user. The web server can require that the client user's browser present the user's certificate before authorizing access to its resources.

The security of public: key cryptography, such as that used in web-based technologies, depends upon the security of the private keys. Knowledge of the client user's private key would allow the intruder to forge the digital signature of the client user. In some cases, the client user's private key is kept on their hard disk and is encrypted via a password. When the particular computer application is launched, the client user is prompted for the password and the private key is then decrypted. It is at this stage that the client user's private key is at risk of becoming known if the security of the client computer has been compromised. See Newman et al, "Public Key Management for Network Security," *IEEE Network Magazine*, (April 1987), Vol. 1, No. 2, pp. 11–16, which provides some background on the management of public/private key pairs. One way to avoid the risk of compromising the private key is to store the private key on the smart card. The smart card and associated reader are then programmed to never divulge the private key itself, yet are still capable of decrypting or signing digital messages.

Even in a system where the smart card has the client user's private key, there is still the risk of "Trojan Horse" attacks, and other compromise risks. For example, an intruder can modify the memory associated with the browser to request some Uniform Resource Locators (URLs), even though these URLs were not requested by the client user. As a result, this modified browser could still improperly use the certificate associated with the client user.

Accordingly, it would be desirable to provide a method and system that allows the user of a client computer that has access to a remote host computer or server to be able to have securely displayed and to securely confirm that a request to access the host computer or server is valid, even if an intruder or computer virus has compromised the security of the client computer, preferably using an intelligent security token such as a smart card and associated devices.

SUMMARY OF THE INVENTION

The present invention relates to a method and system for a client user remotely connected to a host computer by a client workstation such as a client personal computer to have securely displayed and to securely confirm that a request to perform an operation on the host computer was actually requested by the client user. This method comprises the steps of:

(1) in response to the request, generating challenge that includes what operation to be performed on the host computer was requested, a nonce, and a query to determine whether the client user made the request;

(2) encrypting the challenge;

(3) transmitting the encrypted challenge to a secure environment that contains the client user's private key;

(4) decrypting the challenge in the secure environment and securely displaying the decrypted challenge;

(5) waiting for confirmation from the client user that securely confirms either that the client user did or did not make the request to perform the operation on the host computer;

(6) if the client user confirms that:

(a) the client user did not make the request, transmitting a reply encrypted with the client user's private key to the host computer that contains a negative response and the nonce; or (b) the client user did make the request, transmitting a reply encrypted with the client user's private key to the host computer that contains a positive response and the nonce.

The present invention differs from prior systems in that it provides a method in a potentially compromised environment that: (a) uses a secure display (e.g., the information displayed cannot be modified from the client workstation or computer) to protect potentially sensitive resources (e.g., data, information, etc.) from being accessed from the host computer; and (b) allows the client user to securely confirm their intent to perform the requested operation on the host computer, such as to access the requested data, information, etc., by using a decrypted challenge from the host computer that contains a host computer-generated nonce and then transmitting back to the host computer a reply that contains this nonce. In particular, the present invention is desirably employed in a system that uses an intelligent security token such as a smart card and associated devices such as a smart card reader, to provide a secure display of the requested operation to be performed on the host computer and preferably to prompt the client user to securely confirm whether or not they originated the request. The present invention can be used with variety of client-server systems that provide ways for authenticating the client user's identity and/or authorizing access to the server by the client user, including but not limited to, distributed file access systems, RPC server systems and web-based server systems. While the present invention is particularly useful for protecting access to information, data or services that are kept on the host computer, it can also be used to protect other types of transactions or operations that can be performed on the host computer, such as point of purchase sales, electronic commerce, use of server executable content and database transactions or operations executed across a network.

The present invention is especially useful in providing the ability to mitigate the risk to a server when the client computer has been compromised. In particular, the server's resources are protected in the case of either theft of the client user's temporary identity (session keys for example) or where an intruder induces the client user to make a request to the server using the client user's own (valid) authenticated identity (such as in the case of a "Trojan Horse" attack). The present invention also protects the server when an intruder having access to the client computer modifies the client's request in some way en-route to the server. In either of these situations, there is the danger that an unintended (from the client user's perspective) authenticated request is sent from a compromised client computer to the server. For example, the server could be requested to provide a resource (e.g. send a file to the client computer, perform a financial transaction, or perform some other operation) even though the client user never intended to perform this operation. In this way, an intruder can obtain information, services or other resources that they are unauthorized to access from the server.

The present invention minimizes or avoids this risk by prompting the client user to indicate whether it was their intention to access the particular resource. This "proof of intent" challenge cannot be performed by prompting the client user by alternative, insecure methods such as by a computer display to indicate via the computer keyboard their intention or to otherwise access the particular resource. If this prompt (via an insecure display) is used, an intruder or computer virus could modify the name or value of the resource displayed on the monitor to match something that the client user has requested, while in fact another (perhaps more private, or larger, or more significant) resource was actually being requested by the intruder or virus. The present invention also prevents the intruder or virus from circumventing the challenge prompt to the client user, such as by using the computer display and keyboard to capture the client user's keystrokes and turning a negative response (e.g., the client user had no intention to access this resource) into a positive response.

The present invention also allows the use of conventional intelligent security tokens such as smart cards and associated readers as a more secure environment to prompt for, and determine, the client user's intent to access the requested server resource. A display securely accessible from the reader, smart card or both displays the resource (or resources) apparently being requested by the client user. Since this display cannot be accessed directly from the client computer, except by interfaces that are protected by software and/or hardware according the present invention that resides on the reader, smart card or both, the display is less likely to be compromised. The client user is prompted to indicate whether it was their intention to access a resource by an input device or unit associated with the reader or smart card. Again, this input device is unlikely to be compromised since it cannot be accessed from the client computer except through interfaces that are protected by software and/or hardware according the present invention that resides on the reader, smart card or both.

The present invention also allows the server and associated server software to differentiate between resources that have higher or lower security classifications. Resources and their associated security classifications allow the server software to only request client user "proof of intent" for resources above a security threshold selected by the client user. The present invention also allows the server database to be configured such that resources are collected into resource pools or groups, with the proof of intent procedures of the present invention then being applied to the resource pools or groups as a whole. The first time in a session that access to any resource in a particular pool or group is requested, a proof of intent challenge can be sent and a reply obtained. If the reply indicates that the client user did intend to access the resource, this positive reply can be remembered (e.g., via the cache on the server). Upon subsequent attempts by the client user to access this or other resources in the same pool or group, the server software can read the cache and determine that the client user has already confirmed their intent to access portions of this resource pool or group. The server software therefore does not have to re-challenge the client user and pass the request through to the authorization system protecting the resource. This allows the client user requesting multiple related resources to only be subject to one "proof of intent" challenge.

DETAILED DESCRIPTION OF THE INVENTION

1. Definitions

As used herein, the term "client user" refers to the individual or group that has authenticated access to the host computer.

As used herein, the term "client workstation" refers to a terminal or computer that is normally used by the client user as the means to access the host computer.

As used herein, the term "host computer" refers to a computer system, typically a server computer, where the resource, information, data or operation to be performed is stored or kept.

As used herein, the term "software" refers to any form of programmed machine-readable language or instructions (e.g., object code) that, when, loaded or otherwise installed, provides operating instructions to a machine capable of reading those instructions, such as a computer or reader. Software useful in the present invention can be stored or reside on, as well as be loaded or installed from, one or more floppy disks, CD ROM disks, hard disks or any other form of suitable non-volatile electronic storage media. Software useful in the present invention can also be installed by downloading or other form of remote transmission, such as by using Local or Wide Area Network (LAN or WAN)-based, Internet-based, web-based or other remote downloading or transmission methods.

As used herein, the term "nonce" refers to information, typically a large number, that is randomly generated by a computer (e.g., host computer or server) for security purposes, and is preferably used only once. Both client and host computers need to guarantee the freshness of the requests and the respective responses to avoid unauthorized intruder or computer virus attacks. This is typically achieved be generating a nonce that is included in the request and validating the respective response by verifying that the nonce that was originally generated is included in the response. In other words, the nonce provides an "unguessable" way to verify that the response received back is an authentic response to the original request from the host computer and not some other response, e.g., a deceptive one created by either an intruder or computer virus.

As used herein, the term "key(s)" refers to numerical values that are used in cryptographic algorithms to encrypt and decrypt messages. Each key is uniquely associated with a particular identity, such as a person, group, physical object, business, or institution. At least some of the keys are kept secret and used selectively by their owners. For example, using available public key cryptographic algorithms, a person can use their private signature key to electronically sign a purchase order intended for the merchant. This purchase order can then be encrypted using a symmetric (or secret key) encryption algorithm. This secret encryption key can then be encrypted using the merchant's public key exchange key, so that it can be transmitted to the merchant without fear of compromise. To process the purchase order, the merchant will first recover the secret encryption key using their private exchange key. They can then use this private key to decrypt the message. Finally, the merchant could then use the customer's public signing key to verify the signature on the purchase order. Public key algorithms are designed to insure that it is not feasible to determine the corresponding private key even with knowledge of the public key and with examples of data encrypted with the public key.

As used herein, the term "private key" typically refers to the key used for decryption of the message, data, information or the like, and is typically kept secret and secure by the client user.

As used herein, the term "public key" typically refers to the key, used for encryption of the message, data, information or the like.

As used herein, the term "comprising" means various components, capabilities and/or steps can be conjointly employed in the present invention. Accordingly, the term "comprising" encompasses the more restrictive terms "consisting essentially of" and "consisting of."

2. Secure System

Figure 1:
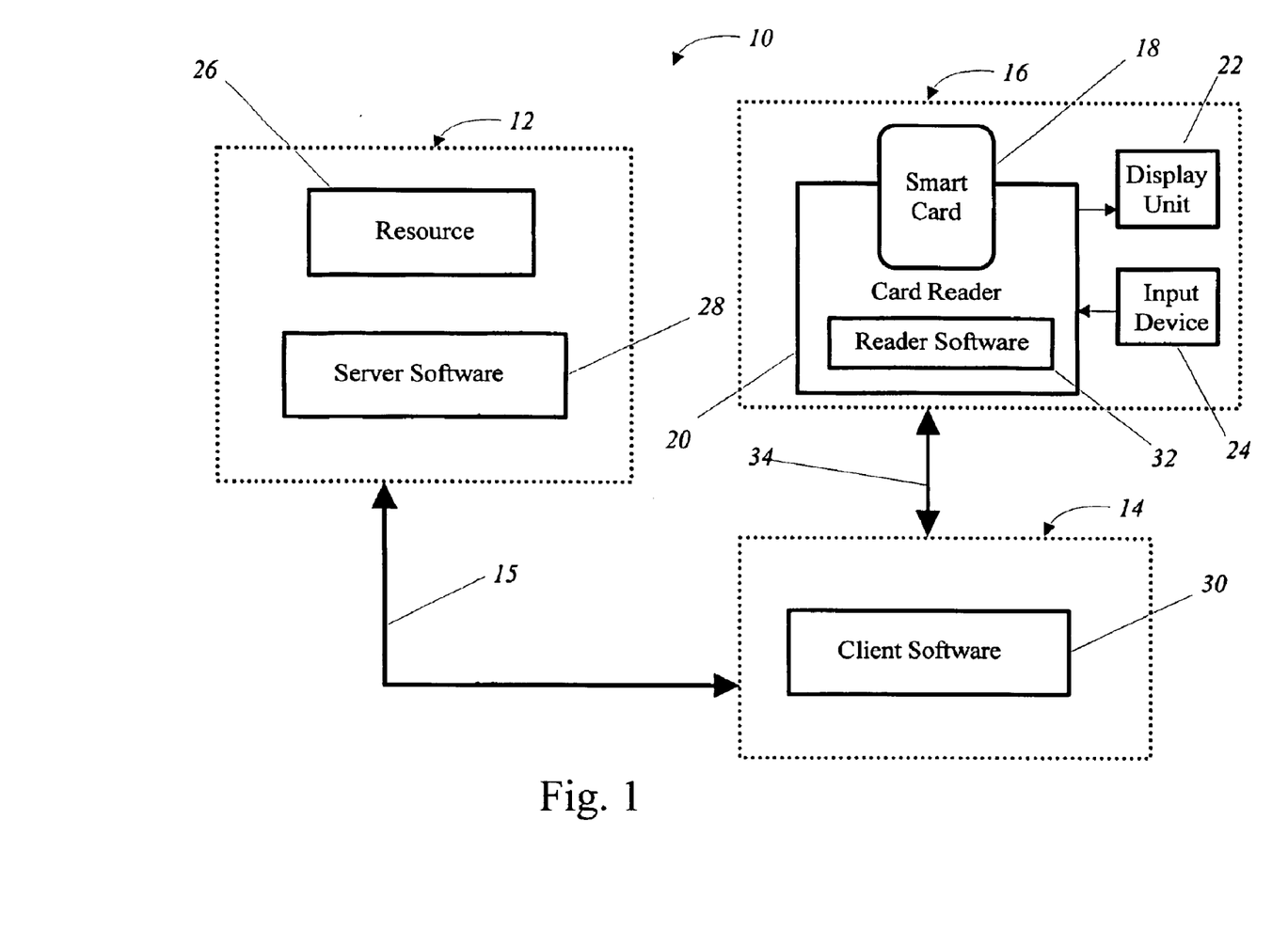
FIG. 1 is a block diagram representing an embodiment of a system according to the present invention.

Referring to FIG. 1, an embodiment of a secure system according to the present invention is indicated generally as 10. System 10 includes a host computer in the form of a server indicated generally as 12, a client workstation in the form of a personal client computer indicated generally as 14 that communicates with server 12 via a communications pathway indicated generally as 15 that can use Internet, web based methods of communication, as well as wireless or Local or Wide Area Network (LAN or WAN) based methods of communication, and a secure environment indicated generally as 16 that includes an intelligent security token in the form of smart card 18, typically an associated smart card reader 20, a display unit 22 and an input device 24. Server 12 is further shown as having resource files, data, or services indicated generally as 26 and server software indicated generally as 28 that controls requests for resources 26. Personal client computer 14 is shown as having client software generally indicated by 30.

Smart card 18 shown in FIG. 1 typically has the following components and/or capabilities:

a. Processing capability. The smart card should normally be able to decrypt an encrypted message sent to it from the remote server computer. This usually means that the smart card should have a processor capable of such decryption.

b. Random access memory (RAM). RAM is usually required in order to assign temporary variables for any processing, so the smart card typically has some amount of RAM. RAM can also hold temporary session keys and certificates.

c. Program memory. In order to execute some portions of the software used in the present invention (and any base operating system required to support it), the smart card usually possesses some amount of program memory.

Program memory is usually protected from unauthorized alteration or modification. This protection is provided either through execution in read-only memory (ROM), by a code signing methodology or some other method that avoids unauthorized program modification.

d. Non-volatile storage. Stable, non-volatile storage (e.g., hard disk) is typically required to keep private key(s) on the smart card.

In addition to or instead of the above components and/or capabilities, smart card 18 can also have the following:

e. Input Capability. In order to allow the client user to express whether it was their intent to access some resource, a secure input capability is typically required. This capability can be provided directly by the smart card itself or by the reader that communicates with the smart card or by other secure methods such that modification of the client user's input by an intruder or computer virus on the client computer is not possible. When the input is provided by the smart card reader, which is preferred in the present invention, no user input capability is required on the smart card.

f. Display Capability. In displaying some or all of the resource or resources that the client user appears to have requested, a secure display capability is required. This display capability can be provided by a local display on the smart card itself, a display device attached to the reader that communicates with the smart card, or by some other secure means. Whatever method of display is employed, it is important that it not be possible for an intruder having access to the client computer to be able to modify the message being displayed. While it is possible to use the display capabilities of the client computer in a secure manner, this typically not the preferred method for securely displaying messages according to the present invention.

Beside these components and/or capabilities, smart card 18 typically has tamper-resistant packaging. The component for performing the public key cryptography can also be implemented as either hardware or software, although software implementations are currently slower compared to hardware or hardware-assisted implementations. Smart card 19 also has a communications interface and at least one communications line for communicating with reader 20. The microprocessor of smart card 18 can be programmed to implement security-critical operations requiring client user authorization, in response to commands received over its communications line(s). While the term "smart card" is usually associated with a particular physical form factor and electrical interface, other configurations could also be used, with whatever designs chosen preferably being relatively portable and tamper-proof, and including features for performing or otherwise facilitating security-critical operations such as providing digital signatures.

Reader 20 acts primarily as a communications interface, providing bi-directional communications between client computer 14 and smart card 18. Reader 20 typically includes a mechanical and electrical interface that receives smart card 18 (e.g., by insertion), and an input/output (I/O) controller that communicates with smart card 18. Reader 20 can also include other components and/or capabilities found in smart card 18, such as processing capability (e.g., microprocessors), RAM, program memory, and non-volatile storage, as well as secure input capability and secure display capability that can be integrated into (or be separate from) the reader itself. Indeed, in one embodiment of the present invention, the software application that decrypts the message and prompts the user for confirmation of the request made to the server could reside mostly on the card reader (while accessing the smart card for the private decryption keys) as indicated generally by 32. In another embodiment according the present invention, software 32 could reside mostly on smart card 18 (using reader 20 as a pathway to receive messages and replies from server 12).

Although not shown in FIG. 1, one or more communications lines typically extend between the I/O controller of reader 20 and the smart card interface to provide bi-directional communications between the I/O controller and smart card 18. The I/O controller of reader 20 also has a bi-directional communications medium or pathway indicated generally as 34 to client computer 14, through which communications between smart card 18 and client computer 14 are provided. The I/O controller can be a microprocessor or microcontroller (e.g., can be the same microprocessor or controller used to control the functions of keyboard used with client computer 14), along with associated peripheral circuits.

Reader 20 is usually connected to input device 24, typically in the form of a, security actuator, button or key that is physically operable by the client user. Actuator 24 can be an additional or existing key on the keyboard connected to client computer 14, so long as there is a way or method provided that allows the client user to shut off or otherwise disconnect access to input device 24 during secure operations according to the present invention so that it is not directly accessible or modifiable from the client computer 14 in the event client computer 14 has been compromised. However, for a more conventional reader 20, the actuator can be a push-button, sensor, or some other type of input device, located on 20 reader, that requires physical effort or contact by the client user for its operation. Actuator 24 can also be a device associated with some other device that requires or allows physical operation, such as, for example, a sensor or switch that detects the insertion of smart card 18 into reader 20. In general, actuator 24 can be any device that is activated by a deliberate physical effort on the part of the client user.

Actuator 24 is typically connected so that its operation can be detected by the I/O controller of reader 20 and is used to confirm that the client user has requested the resource file or data from server 12 before smart card 18 performs any security-critical operations. Actuator 24 is connected and the I/O controller is programmed in such a way that client computer 14 cannot emulate the operation of actuator 24. Pressing actuator 24 generates a "Yes, I intended to access this resource" signal or code within reader 20 that is sent directly to smart card 18, without first being directed to client computer 14. In other words, client computer 14 is not involved in generating the client user's code; it is instead generated by the logic within reader 20 and sent directly to smart card 18.

Reader 20 is programmed to decrypt the incoming challenge from server 12 by passing the encrypted challenge to card 18 and awaiting receipt of the decrypted challenge. Reader 20 is programmed to display the resource (or pool of resources) named in the challenge from server 12 on display unit 22. Reader 20 can be further programmed to wait for the client user's confirmation regarding the request before sending a signal to confirm the intent of the client user to access the requested resource 26 from server 12 according to the present invention.

Reader software 32 can also be programmed to wait for client user confirmation by requiring the client user to press actuator 24 for positive confirmation. More specifically, reader 20 is typically configured to receive an encrypted challenge from server 12, decrypting the challenge (via smart card 18) and prompting for confirmation of the request for access to resource 26 from server 12, in response to the detect or wait for operation of actuator 24. Smart card 18 can also be optionally programmed to automatically and temporarily disable itself if the correct counter-signal is not received in response to the request for confirmation within a preset time limit.

The various steps relating to actuator 24 are typically performed independently of client computer 14. Furthermore, these steps can be implemented in such a way that software 30 running on client computer 14 does not even need to know of the presence or operation of actuator 24. Reader 20 is specifically configured to prevent the client computer 14 from supplying the actuator signal to smart card 18 during the period between receiving the request for confirmation and detecting the operation of actuator 24. This period corresponds to the period when smart card 18 is waiting for the user to operate actuator 24. This ensures that an intruder or computer virus that has compromised and gained access to client computer 14 cannot utilize the services of secure environment 16 without the knowledge of the client user.

In normal operation according to the present invention, smart card 18 contains the private key of the client user and is typically not divulged to others. Reader 20 can choose to decrypt messages using card 18 and usually has more general computer processing capability than card 18, including the ability to communicate electronically with personal computer 14 through pathway 34. Smart card 18 and reader software 32 facilitate security-critical operations according to the present invention and are particularly useful in potentially insecure environments for which the present invention is advantageous, because their code is: (a) simple; and (b) difficult to change. This also makes it difficult for a would-be intruder (or computer virus) to modify the behavior of smart card 18 and reader 20. Generally, the smart card 18 and reader 20 provide a secure environment 16 in which tasks such as decryption (e.g., of a server challenge) can occur. The embedded operating system typically present on the smart card reader 20 receives messages from the client computer 14 (that may have originated from server 12) via pathway 34 and communicates with the smart card 18 for security operations according to the present invention, such as decryption. In some embodiments according to the present invention, this communication can include an attempt by a remote authentication service to prove the identity of the client user on computer 14. Software 32 running on either the smart card 18 or more typically on the card reader 20 is typically used to display and confirm that the client user has requested resource 26 from server 12.

The system shown in FIG. 1 with the secure environment 16 comprising the smart card 18, a smart card reader 20 or a combination of both, provides a type of virtual private network (VPN) according to the present invention without significant risk of an intruder (or computer virus) being able to gain unauthorized access to sensitive files, data, resources or other operations on server 12. For example, one embodiment for creating a VPN could be as follows: In response to a request for resource 26, server software 28 obtains the public key of the client user with whom server 12 intends to transmit a challenge message regarding the request. The server 12 then encrypts the challenge message and a symmetric session key and a nonce with the public key just obtained. The encrypted challenge message is then transmitted to client computer 14 via communications pathway 15. The client software 30 residing on client computer 14 passes the encrypted challenge it receives from server 12 to the secure environment 16.

At this stage, even with a compromised client computer 14, the intruder or computer virus would be unable to decrypt the challenge message sent by server 12 unless it knew the private key of the client user. Since smart card 18 is designed to never release private keys, including the private key of the client user, the intruder would be unable to intercept the message for encrypted message from server 12, so that the client software 30 on client computer 14 transfers the message unchanged to reader 20. Software 32 running in the protected storage memory (e.g., ROM) on reader 20 receives the message header and encrypted message and instructs smart card 18 to decrypt the message sent by server 12. Once the message is decrypted by smart card 18, the symmetric session key and nonce is obtained and a message encrypted with this symmetric session key can be transmitted to server 12 (via client computer 14), thus establishing the VPN.

3. Method for Implementing the Secure System

The method for implementing the secure system shown in FIG. 1 allows a request to perform an operation on server 12 to be securely displayed, as well as allowing the client user to securely confirm that the request to perform this operation on server 12 was actually requested by the client user, even if the security of the client computer 14 has been compromised by an intruder having access to client computer 14 or by a computer virus such as a Trojan Horse file. In response to such a request, such as a request to access resource 26, server 12, typically using software 28 residing on it, creates or generates a challenge to this request. This challenge will at least include the resource that was requested, a nonce, and a query as to whether the client user made the request. Server software 28 will then encrypt this challenge, typically via the client user's public key.

The encrypted challenge is then transmitted from server 12 via communications pathway 15 to the secure environment 16 that contains smart card 18. Typically, this encrypted request is transmitted initially to client computer 14. Even if the security of client computer has been compromised, client software 30 will transmit or pass the encrypted challenge without modification to secure environment 16, typically by passing the encrypted challenge via communications pathway 34 to reader 20 for decryption by smart card 18.

Reader 20 typically passes the encrypted challenge on to smart card 18 for decryption. Because smart card 18 has the private key for the client user, smart card 18 can securely decrypt the challenge for secure display to the client user. Smart card 18 decrypts the challenge and, using reader 20, determines the nonce and the resource that was requested from server 12. Reader 20 then has the decrypted challenge securely displayed on display unit 22 so that unit 22 is not directly accessible or modifiable from the client computer 14 in the event client computer 14 has been compromised. The decrypted challenge that is displayed on display unit 22 will at least include resource 26 (or pool of resources) that was requested from server 12 and optionally, but preferably, the operation that was to be performed with the resource.

After the challenge has been securely decrypted and displayed, reader 20 will wait for confirmation or a reply from the client user that securely confirms either that the client user did or did not make the request for this resource. If the client user confirms that they did not-make the request, they will indicate this negative response through actuator 24. Using reader 20, smart card 18 will receive this negative response and will encrypt (with the client user's public key from server 12) a reply that contains a negative response and the nonce originally generated by server software 28. This encrypted negative reply is then transmitted by reader 20 via communications pathway 34 to client computer 14. Again, client software 30 will transmit or pass the encrypted negative reply without modification to server 12 via communications pathway 15. On receiving the encrypted negative reply, server software 28 will decrypt the negative reply (with the server's private key) and, in response to this negative reply, deny access to the requested resource.

Similarly, if the client user confirms that they did make the request, they will again indicate this positive response through actuator 24. Using reader 20, smart card 18 will receive this positive response and will encrypt a reply, again with the server's public key, that contains the positive response and the nonce originally generated by server software 28. This encrypted positive reply is then transmitted by reader 20 via communications pathway 34 to client computer 14. Again, client software 30 will transmit or pass the encrypted positive reply without modification to server 12 via communications pathway 15. On receiving encrypted positive reply, server software 28 will decrypt the positive reply and, in response to this positive reply, authorize access to the requested resource or optionally transmit or pass the original request on to the authorization component of server 12.

Figure 2:
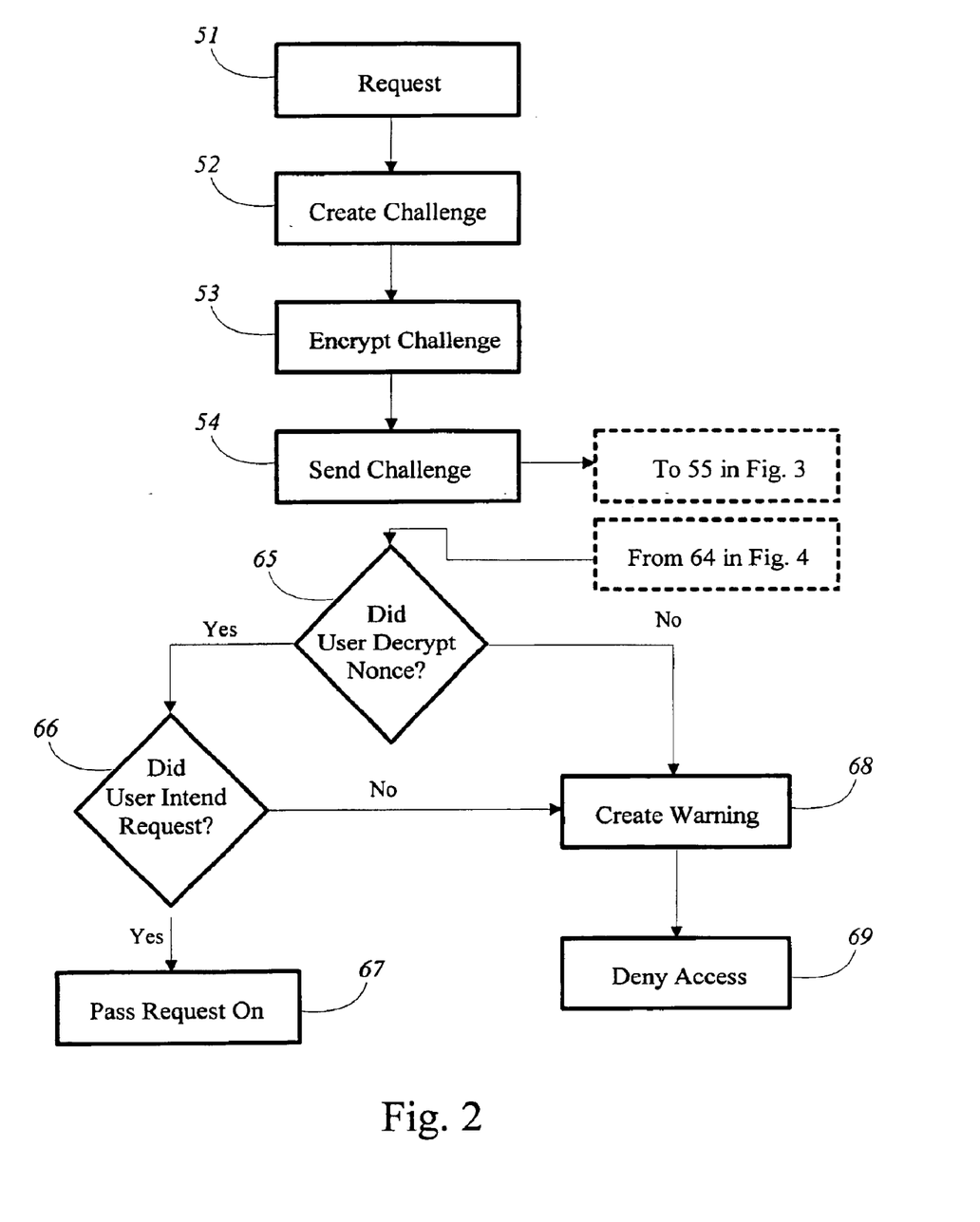
FIGS. 2 to 4 represent a flowchart illustrating the steps that are carried out according to an embodiment of a method of the present invention using the system shown in FIG. 1.
Figure 3:
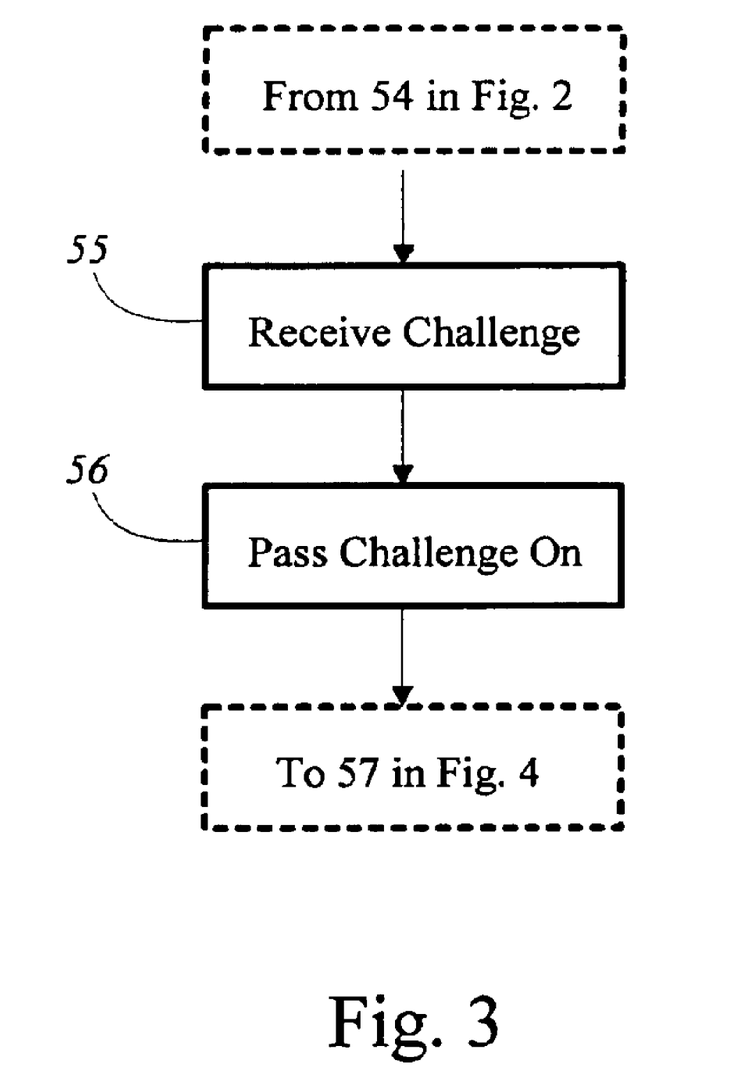
Figure 4:
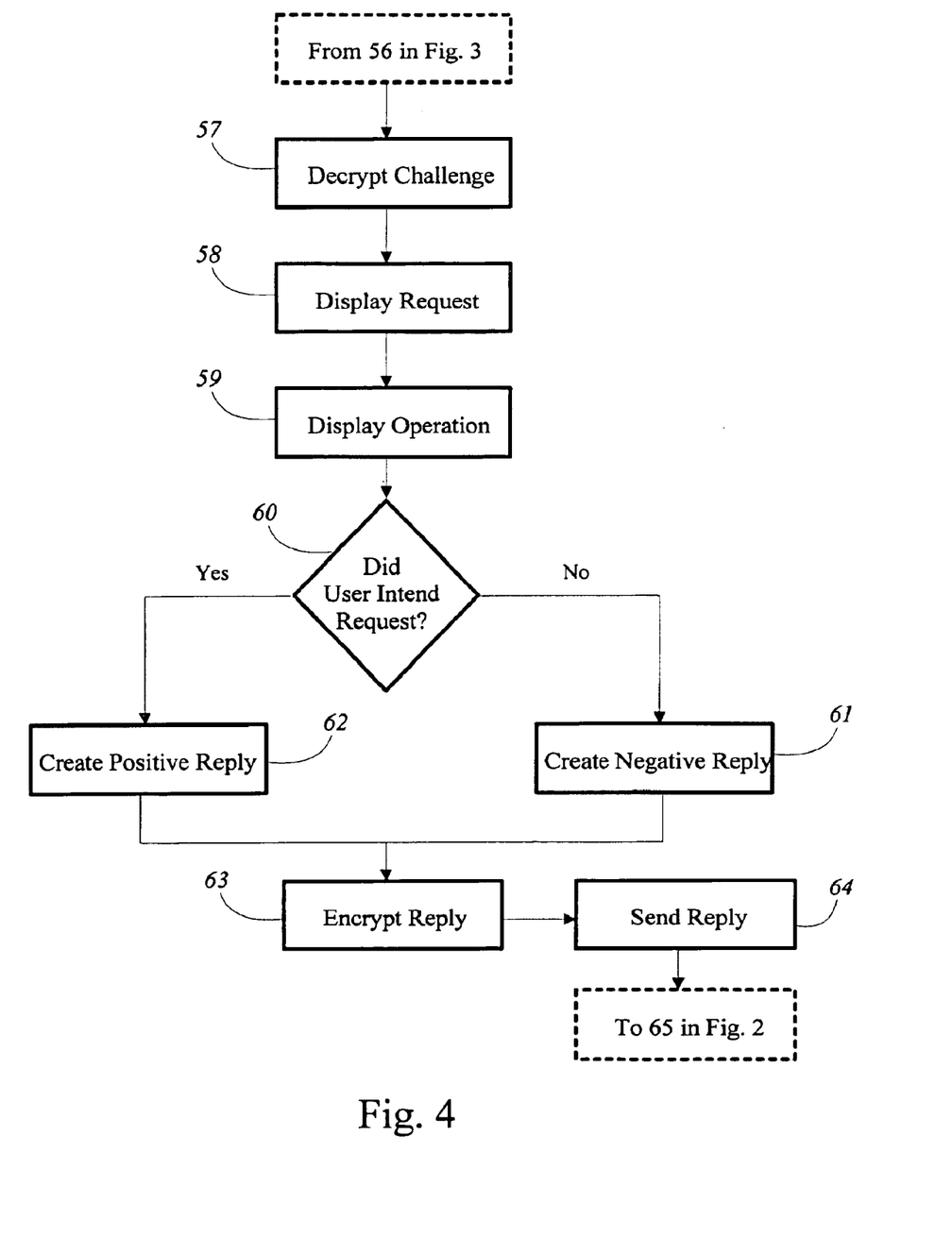

FIGS. 2 to 4 provide a flowchart to illustrate in more detail an embodiment of the method of the present invention for implementing the secure system of FIG. 1. Referring to FIG. 2, initial step 51 shows a request for a resource file or data 26 from server 12. This request could include some identification information as to who the requestor is. In the case of web-based communications, the identification information is typically a (public key) certificate. In the case of distributed file access systems such as the New Technology File System (NTFS), the identification information is often the user's login identifier number from the user's personal client computer 14. In an authenticated RPC application such as Microsoft DCOM, the user identification information is typically the Kerberos Privilege Attribute Certificate (network credentials) of the requester.

In the absence of the method of the present invention, these requests would normally pass through to the authorization logic on server 12. However, in the method of the present invention, server software 28 intercepts this request and obtains the (apparent) identity of the requestor. The type of operation or resource 26 apparently requested by the client user is obtained (e.g., if this was an http request to read some html file, the type of operation would be "read access"). Server software 28 then typically determines if the resource 26 requested is currently protected.

If the resource 26 is one that is protected, server software 28 in step 52 creates or generates a challenge as to whether the client user intended to request this resource. This challenge includes at least what resource 26 (or pool of resources) was requested, as well as a nonce. As shown in step 53, after creating challenge, server software 28 typically obtains the public key of the (apparent) requester and then encrypts this challenge with this public key. As shown in step 54, the encrypted challenge is then transmitted or sent to client computer 14.

Referring to FIG. 3 and as shown in step 55, the challenge is received at client computer 14. As shown in step 56, client software 30 passes on the encrypted challenge without modification (i.e., verbatim) to reader 20 (via pathway 34) in secure environment 16. Referring to FIG. 4 and as shown in step 57, reader software 32 running on reader 20 receives the encrypted challenge and passes the encrypted challenge to smart card 18 for decryption. The smart card decrypts the challenge using the private key of the client user. Reader software 32 then learns the nonce contained or embedded in the challenge. Decryption of the challenge (by the client user's private key) is used as proof that the client user is present (i.e., otherwise smart card 18 would have been removed).

Reader software 32 also learns the name of the resource 26 apparently requested by the client user (since this name is also stored in the challenge). As shown in step 58, this resource name is then displayed securely on display unit 22. In an alternate embodiment, the name of the resource 26 displayed could be a name that represents a collection of resources rather than one. As shown in step 59, reader software 32 can (optionally) learn the type of operation apparently requested by the client user (e.g. read, write, withdraw cash, etc.). This type of operation can be optionally displayed on display unit 22.

As shown in step 60, client user is prompted to indicate whether it was, in fact, their intent to perform this type of operation with this resource by providing an input to reader 20. This input is either a "Yes, I intended to access this resource" or "No, I did not". For practical reasons, the first time in a session that client user is prompted, a Personal Identification Number (PIN) can be required. Reader software 32 can cache this PIN for efficiency upon subsequent challenges. The client user's response is then evaluated.

As shown in steps 61 and 62, a reply to the challenge is prepared by reader software 32 running on reader 20. The form of this reply is dependent upon whether the client user did or did not intend to access the resource in question. As shown step 61, if the client user indicated that they did not intend to access this resource 26, then a reply is prepared which includes: (a) a negative response; (b) the resource in question; and (c) the nonce originally created by server software 28. As shown step 62, if the client user indicated that they did intend to access this resource 26, then a reply is prepared which includes: (a) a positive response; (b) the resource in question; and (c) the nonce originally created by server software 28. As shown in step 63, the reply prepared in steps 61 or 62 is encrypted using the public key from server 12. An unencrypted header is also added to indicate the intended destination of the reply. As shown in step 64, this encrypted reply is first passed from reader 20 (via pathway 34) to client computer 14. Client software 30 forwards the encrypted reply without modification (i.e., verbatim) to server 12 (via pathway 15).

Referring again to FIG. 2 and as shown in step 65, server software 28 reads the header from the encrypted reply sent in step 64, determines the identity of the sender and uses its private key to decrypt the reply. Server software 26 then determines whether or not the client user was able to decrypt the nonce originally sent in step 64 and reproduce it faithfully. This ensures that the encrypted reply was created by the client user.

As shown in step 66, server software 66 determines whether or not the client user had intended to access resource 26. As shown in step 67, if the client user did intend to access the resource 26, then the original request is passed on to its intended destination. The authorization logic protecting this resource is unchanged so it is still possible for the client user to be denied access to the resource. As shown in step 68, if the client user did not intend to access this resource 26 (e.g., the request is generated from some form of Trojan Horse program or other computer virus, etc.), a warning can be generated and can be passed to other software such as an Intrusion Detection System. As shown in 69, server software 28 will then generate a "permission denied" reply and then send the reply to the requesting process to deny access to resource 26.

The present invention can also be provided in the form of downloadable or otherwise installable software that can be used in system 10, and in particular as the combination of the server software component 28 (used with server 12), the client software component 30 (used with client computer 14) and software component 32 (which is shown as being used with reader 20 but which could be optionally used with smart card 18). This software can be provided or associated with a set of instructions for downloading or installation of the software on the system and/or use of the software with the system that are written or printed on one or more sheets of paper, in a multi-page manual, at the location where the software is located for remote downloading or installation (e.g., a server-based web site), on or inside the the software is provided or sold, and/or on the electronic media CD ROM disk) from which the software is loaded or installed, method for providing instructions on how to load, install and/or

What is claimed is:

1. A method for a client user remotely connected to a host computer by a client workstation to have securely displayed and to securely confirm that a request to perform an operation on the host computer was actually requested by the client user, the method comprising the steps of:

(1) in response to the request, generating a challenge that includes what operation to be performed on the host computer was requested, a nonce, and a query as to whether the client user made the request;

(2) encrypting the challenge;

(3) transmitting the encrypted challenge to a secure environment that contains the client user's private key;

(4) decrypting the challenge in the secure environment and securely displaying the decrypted challenge;

(5) waiting for confirmation from the client user that securely confirms either that the client user did or did not make the request to perform the operation on the host computer;

(6) if the client user confirms that:

(a) the client user did not make the request, transmitting a reply encrypted with the host computer's public key to the host computer that contains a negative response and the nonce; or (b) client user did make the request, transmitting a reply encrypted with the host computer's public key to the host computer that contains a positive response and the nonce.

2. The method of claim 1 wherein the request is for access to a resource on the host computer.

3. The method of claim 2 wherein the challenge encrypted during step (2) is encrypted with the client user's public key.

4. The method of claim 2 wherein the secure environment includes an intelligent security token containing the client user's private key that is capable of decrypting the encrypted challenge during step (4).

5. The method of claim 4 wherein the intelligent security token is a smart card and wherein the secure environment includes a smart card reader associated with the smart card and in communication with the client workstation, a secure display unit that is not directly accessible to or modifiable from the client workstation and that is cable of displaying the decrypted challenge during step (4), and a secure input device that is not directly accessible to or modifiable from the client workstation and that is capable of performing step (6).

6. The method of claim 5 wherein the display unit displays during step (4) the resource that was quested and the operation that was to be performed with the resource.

7. The method of claim 5 wherein the client workstation is the client's personal computer and wherein the client computer has residing thereon client computer software that is capable of passing the encrypted challenge during step (3) without modification to the reader and passing the encrypted reply to the host computer during step (6) without modification.

8. The method of claim 2 wherein the client user is prompted during step (5) to confirm that the client user did or did not request access to the resource on the host computer.

9. The method of claim 2 which further comprises the step of decrypting the reply transmitted during step (6) and:

(a) if the decrypted reply contains a negative response, deny the request to perform the operation on the host computer; or (b) if the decrypted reply contains a positive response, pass through the request to perform the operation on the host computer to an authorization system of the host computer.

10. A system for securely displaying and securely confirming that a request to access a resource on a server computer was actually requested by the client user, the system comprising:

(a) a server computer having at least one resource;

(b) server computer software residing on the server computer that is capable of generating an encrypted challenge to a request for the at least one resource that includes what the at least one resource requested was, a nonce, and a query as to whether the client user made the request, and that is capable of decrypting an encrypted reply transmitted from the secure environment;

(c) a client computer in communication with the server computer;

(d) client computer software residing on the client computer that is capable of passing an encrypted challenge to the secure environment without modification and passing an encrypted reply from the secure environment without modification to the server computer;

(e) a secure environment that includes:

(1) a smart card reader in communication with the client computer;

(2) a smart card that is capable of communicating with the reader and that contains the client user's private key;

(3) reader computer software residing on the reader that is capable, in association with the smart card, of decrypting an encrypted challenge, transmitting the decrypted challenge to a secure display unit, receiving a reply from a secure input device, encrypting the reply received from the input device and transmitting the encrypted reply to the client computer;

(4) a secure display unit capable of securely displaying a decrypted challenge from the reader such that an intruder or computer virus potentially having access to the client computer cannot modify what is displayed;

(5) a secure input device associated with the reader that is capable of responding to a reply from the client user as to whether or not the request for access to the at least one resource was actually requested by the client user and is configured such that an intruder or computer virus potentially having access to the client computer cannot modify input received by the input device.

11. The system of claim 10 wherein the server computer software residing on the server computer uses the client user's public key as an encryption key for generating the encrypted challenge.

12. The system of claim 10 wherein the display unit is capable of displaying the resource that was requested the operation that was to be performed with the resource.

13. The system of claim 10 wherein the smart card is capable of being inserted into the reader.

14. The system of claim 13 wherein the input device is connected to the reader.

15. The system of claim 13 wherein the client user is prompted by the secure environment to confirm that the client user did or did not request access to the resource on the server computer.

16. Software for use in a system for securely displaying and securely confirming that a request to perform an operation on a server computer was actually requested by the client user, the system including a server computer, a client computer in communication with the server computer, and a secure environment that has a smart card reader in communication with the client computer, a smart card that is capable of communicating with the reader and that contains the client user's private key, a secure display unit capable of securely displaying a decrypted challenge from the reader such that an intruder or computer virus potentially having access to the client computer cannot modify what is displayed and a secure input device associated with the reader that is capable of responding to a reply from the client user as to whether or not the request to perform the operation was actually requested by the client user and is configured such that an intruder or computer virus potentially having access to the client computer cannot modify input received by the input device, the software comprising:

(a) a server computer software component that can reside on the server computer and is capable of generating an encrypted challenge to a request to perform the operation that includes what operation to be performed on the server computer was requested, a nonce, and a query as to whether the client user made the request, and that is capable of decrypting an encrypted reply transmitted from the secure environment;

(b) a client computer software component that can reside on the client computer and is capable of passing an encrypted challenge to the secure environment without modification and passing an encrypted reply from the secure environment without modification to the server computer; and (c) a computer software component that can reside on the reader or the smart card, and that is capable, in association with the smart card, of decrypting an encrypted challenge, transmitting the decrypted challenge to a secure display unit, receiving a reply from the secure input device, encrypting the reply received from the input device and transmitting the encrypted reply to the client computer.

17. The software of claim 16 that is stored and installable from one or more nonvolatile electronic storage media.

18. The software of claim 17 wherein the electronic media are floppy disks or CD ROM disks.

19. The software of claim 16 which has instructions provided or associated therewith for how to use the software with the system, how to install the software on the system, or how to use with and install the software on the system.

20. The software of claim 16 wherein the computer software component (c) is a reader software component that is capable of residing on the reader.

* * * * *